F. E. CANDA.
COMPOSITE METAL INGOT.
APPLICATION FILED NOV. 6, 1911.
1,059,525.
Patented Apr. 22, 1913.
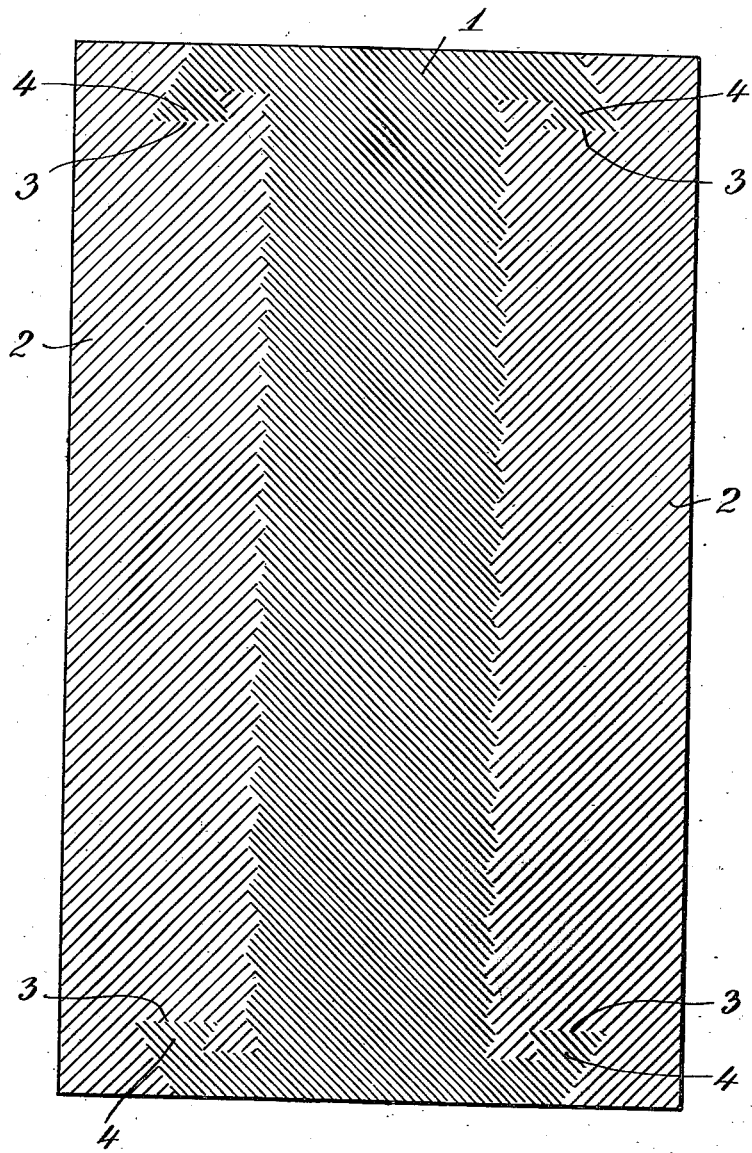

UNITED STATES PATENT OFFICE.

FERDINAND E. CANDA, OF NEW YORK, N. Y.

COMPOSITE METAL INGOT.

1,059,525.  Specification of Letters Patent.  Patented Apr. 22, 1913.

Original application filed September 6, 1911, Serial No. 647,958. Divided and this application filed November 6, 1911. Serial No. 658,889.

*To all whom it may concern:*

Be it known that I, FERDINAND E. CANDA, a citizen of the United States of America, and a resident of New York, in the county of New York and State of New York, have invented certain new and useful Improvements in Composite Metal Ingots, of which the following is a specification.

My invention relates to composite metal ingots such as may be used for forming vault plates, safe plates, jail bars, etc., and comprises an ingot composed of outer layers and an intermediate layer, the intermediate layer preferably of a different grade of metal than the outer layers, said intermediate layer interlocked with the outer layers as hereinafter described.

The object of my invention is to provide an improved composite ingot of the class described, wherein the several layers of metal shall be firmly interlocked.

I will now proceed to describe my invention with reference to the accompanying drawing showing a transverse horizontal section of the ingot.

In said drawing, 1 designates the intermediate layer and 2, 2 designate the outer layers. Said outer layers are provided in their ends with transversely undercut grooves or recesses 3 of dovetail contour, and intermediate layer 1 is provided with corresponding projecting portions 4 extending into said dovetail grooves 3, and so firmly locking the several layers of metal together.

In practice the ingot is formed by placing the outer layers 2 within a mold and pouring molten metal to form the intermediate layer 1 into the mold, the molten metal so poured filling the dovetail grooves 3. The process of so forming the ingot, and the mold used for forming such ingot, are illustrated, described and claimed in my application Sr. No. 647,958, filed September 6, 1911, (Patent No. 1,013,860, dated January 9, 1912) of which application the present case is a division.

In practice the outer layers 2 are usually of a relatively high carbon steel, as compared with the intermediate layer 1, the metal cast to form layer 1 having, therefore, a higher melting temperature than does the metal of the outer layers 2. This greatly facilitates the formation of at least a partial weld between layer 1 and layers 2; and in practice such a weld is realized. The interlocking of the layers 1 and 2 causes the outer layers 2 to follow the layer 1 during the contraction of the metal of such layer 1, during solidification and cooling.

The several layers of metal of which the ingot is composed being firmly united to each other, as above described, the ingot may be rolled or otherwise worked into the form of sheets, bars rods, etc., in the same manner as an ordinary ingot composed of one grade of metal only.

What I claim is:—

1. A composite metal ingot comprising outer layers and an intermediate layer, said outer layers having in their ends transversely undercut recesses of dovetail contour, said intermediate layer extending partly but not completely around the ends of said outer layers, and extending into said undercut dovetail recesses and substantially filling the same, whereby the several layers are effectively interlocked.

2. A composite metal ingot comprising outer layers and an intermediate layer, said outer layers having in their ends recesses extending from the said ends of said layers inward and which, as viewed from the ends of said layers, are of transversely undercut configuration, said intermediate layer extending partly but not completely around the ends of said outer layers, and having portions extending into said undercut recesses and substantially filling the same, whereby the several layers are effectively interlocked.

3. A composite metal ingot comprising two layers, one of said layers having in its ends transversely undercut recesses extending from the said ends of said layer inward, the other layer having projections extending over the ends of said end-recessed layer into said undercut recesses, and substantially filling the same, whereby the two layers are effectively interlocked.

In testimony whereof I have signed this specification in the presence of two subscribing witnesses.

FERDINAND E. CANDA.

Witnesses:
H. M. MARBLE,
D. A. DAVIES.